July 6, 1948.  H. G. BUSIGNIES ET AL  2,444,427
GAS FILLED TUBE
Original Filed March 26, 1943
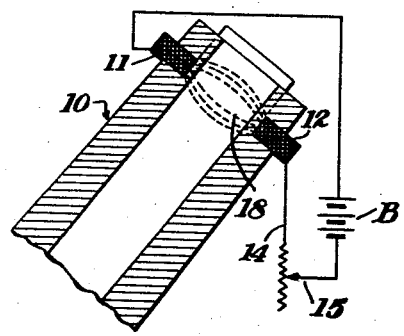
Fig: 1.
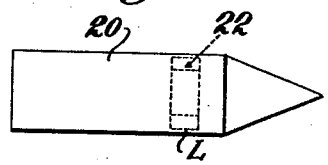
Fig: 2.
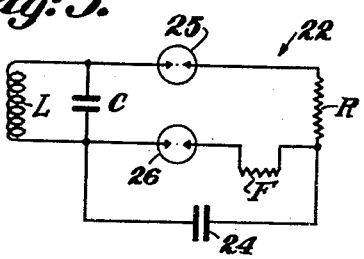
Fig: 3.
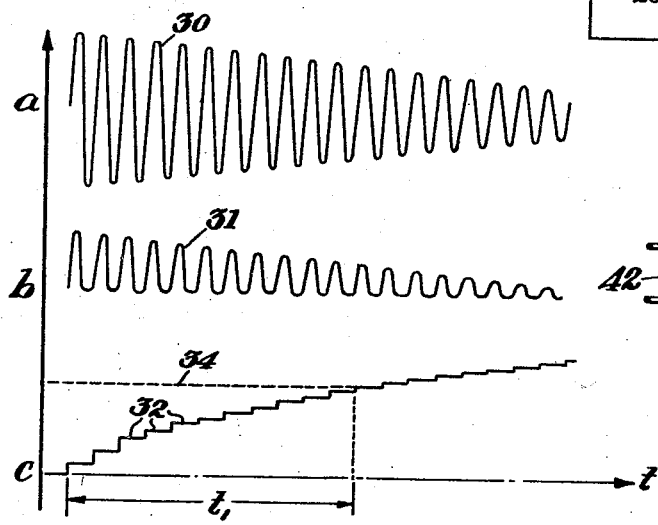
Fig: 4.
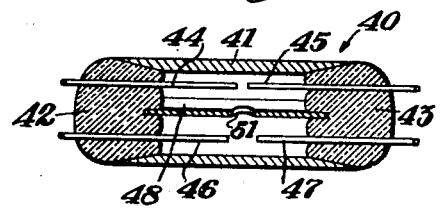
Fig: 5.
INVENTORS
HENRI G. BUSIGNIES
LOUIS A. DE ROSA
BY
*Percy P. Lantzy*
ATTORNEY Patented July 6, 1948

2,444,427

UNITED STATES PATENT OFFICE 2,444,427

GAS FILLED TUBE

Henri G. Busignies, Forest Hills, and Louis A. de Rosa, West Brighton, Staten Island, N. Y., assignors to Federal Telephone and Radio Corporation, New York, N. Y., a corporation of Delaware Original application March 26, 1943, Serial No. 480,632. Divided and this application August 19, 1944, Serial No. 550,130

2 Claims. (Cl. 176—122)

This invention relates to gas-filled tubes and more particularly to a tube construction particularly adapted for use in time control circuits such as used in certain types of detonable projectiles. This is a division of our copending application Serial No. 480,632 filed March 26, 1943.

According to the invention disclosed in our copending application Serial No. 480,632, the muzzle of a gun for firing detonable shells is provided with magnetic means for the establishment of a magnetic field the intensity of which is controlled. Each detonable shell is preferably provided with a detonating fuse of the combination impact and time character together with an electrical circuit for timing with limits the firing of the fuse. This circuit includes a shock excitable L-C circuit which produces an oscillatory wave when the shell is projected through the magnetic field. The speed of the shell and the intensity of the field determine the amplitude of the oscillations established in the L-C circuit. Arranged in parallel with the fuse element of the circuit is an energy storing device such as a condenser, together with means for rectifying the oscillations of the L-C circuit whereby rectified energy is stored in the condenser. When the voltage of the stored energy reaches a predetermined amount the energy is discharged by means of an energy discharge tube through the fuse element, thereby detonating the explosive charge of the shell.

It is an object of the present invention to provide an improved construction for gas-filled tubes for use in such a timing circuit and for other timing operations.

The improved tube construction of the present invention increases the accuracy of the timing operation of such timing circuits by employing two pairs of electrodes to perform the functions of the rectifier means and the energy discharge tube above referred to. By associating the two pairs of electrodes in a single tube, the ionization at the first pair of electrodes may be used to periodically prime the gap at the second pair of electrodes. That is to say, the periodic conduction occurring at the rectifying operation of the first pair of electrodes will each time partially ionize the gap between the second pair of electrodes so that when the voltage of the stored energy closely approximates the predetermined value, the second pair of electrodes will conduct in synchronism with the conduction at the first pair of electrodes. Thus, the detonation will occur a time interval equal to substantially a multiple of the wavelength at which the L-C circuit is tuned. This interval, however, will vary according to the muzzle velocity of the shell and the intensity of the magnetic field. The importance of the present tube construction for such timing systems is that the interionization feature thereof renders definite the timing in multiples of a given wavelength.

For a further understanding of the invention, reference may be had to the following detailed description to be read in connection with the accompanying drawings, in which:

Fig. 1 is a diagrammatical, longitudinal cross sectional view of the muzzle of a cannon or other shell projecting device provided with means for establishing a magnetic field;

Fig. 2 is a side elevational view of a shell provided with an electromagnetically operated fuse;

Fig. 3 is a schematic wiring diagram of the electromagnetically operated fuse;

Fig. 4 is a graphical illustration of the timing operation of the electrically operated fuse; and Fig. 5 is a view in longitudinal cross section of the gas-filled tube construction of this invention useful in the electrical timing circuit of Fig. 3.

Referring to Figs. 1, 2, 3 and 4, a gun muzzle 10 is shown provided with a pair of magnetic coils 11 and 12 connected by circuit 14 to a source of energy B and a rheostat 15 by which the energy supplied to the coils 11 and 12 is controlled. The coils 11 and 12 are suitably arranged in the muzzle 10 so as to provide a magnetic field 18 through which the shell 20, such as shown in Fig. 2, must pass when projected by the gun. The shell is provided with an electromagnetically operated timing circuit 22, Fig. 3. This timing circuit comprises a resonant L-C circuit which is responsive to the field 18 when the shell is projected therethrough to set up an oscillatory wave 30 (curve a, Fig. 4). It will be understood, of course, that the coils 11 and 12 are so arranged as to provide a desirable amount of magnetic flux where the coil L will cut the same when the shell is fired from the gun.

The timing circuit 22 includes a fuse element F and an energy storing device such as condenser 24. The oscillations 30 established by the L-C circuit are rectified by means such as a gas-filled tube 25 and applied through a limiting resistor R to the condenser 24. Connected in parallel with the rectifier tube 25 and resistor R on the one hand and the condenser 24 on the other hand is the fuse element F and an energy discharge tube 26. This timing circuit makes up into a compact unit which is enclosed within the shell substantially as indicated in Fig. 2. The coil L is preferably disposed adjacent the side wall of the shell, but other arrangements may be made so long as the circuit will be shock excited when the shell is projected through the magnetic field 18.

The operation of the electromagnetically controlled timing circuit may be better understood by reference to Fig. 4 in which all the curves are applied to the same time base. Curve a as hereinbefore stated represents the oscillatory wave 30 established in the L-C circuit. Curve b represents the pulses of rectified energy 31 produced by the rectifier tube 25 in response to the wave 30. Curve c represents the building up of stored energy in the condenser 24 according to the supply of the rectified energy 31. It will be noted that the energy stores up in "steps," the stored energy increasing in voltage a small amount for each of the steps 32. Since the wave 30 is damped and the pulse energy 31 decreases in time, the steps 32 of the stored energy becomes less and less as the shell continues in its flight.

Assuming that the level 34 represents a pre-determined voltage value at which the tube 26 will conduct, it will be clear that energy of the condenser 24 will discharge through the fuse element F a time interval $t_1$ after the firing of the shell. By varying the field intensity 18 by manipulation of the rheostat 15, the rapidity of the voltage build-up at the condenser 24 may be controlled. Thus, the time interval required for the stored energy to build-up to the level 34 may be varied at the position of the gun by controlling the rheostat 15. It will, therefore, be clear that according to our invention, the accuracy of fuse timing is greatly improved.

In Fig. 5, we have shown an improved gas-filled tube construction 40 which may be used in the place of the tubes 25 and 26 of Fig. 3. The tube 40 comprises a metal sleeve 41, such as nickel, the ends of which are closed by glass beads 42 and 43. Disposed through the beads are two pairs of electrodes. The first pair 44, 45 correspond to the electrodes of the tube 25 while the second pair of electrodes 46, 47 correspond to the electrodes of the tube 26. Disposed between the two pairs of electrodes is a partition 48 which may be of any suitable form so long as it provides a limit communication between the spaces containing the two pairs of electrodes. For example, the partition may comprise the form of a screen or other foraminous member or as shown, may comprise a plate having one or more openings 51 disposed in the vicinity of the gaps between the electrodes 44, 45 and 46, 47. The gas filling the tube may comprise any suitable inert gas such as neon, argon, helium, krypton or any desired mixture thereof.

The electrodes 44, 45 are so spaced as to provide rectification of a substantial portion of each positive half of the oscillating cycles of the wave 30. Upon conduction, the ionization of the gas at the gap between electrodes 44, 45 will provide a partial ionization through the opening 51 to the gap between electrodes 46, 47. This partial ionization, however, is insufficient to cause conduction between the electrodes 46, 47 until the voltage across the electrodes is nearly high enough to initiate the conduction. When this predetermined voltage value is reached, this partial ionization which occurs each time conduction is established between the electrodes 44, 45 determines the instant at which the electrodes 46, 47 conducts. Thus, it will be clear that the conduction of the electrodes 46, 47 occurs an interval of time after the firing of the gun equal to a multiple of the oscillations of the wave 30. This provides for a more accurate prediction of the detonation of the shell according to the adjustment of the rheostat 15.

It will be recognized by those skilled in the art that the partition 48 may be dispensed with where the spacing between the two pairs of electrodes is such that the ionization occurring at the electrodes 44, 45 will produce the desired partial ionization at the electrodes 46, 47. For compactness, however, the partition 48 is desirable so as to limit the ionization of the space at the electrodes 46, 47 upon conduction at electrodes 44, 45.

While we have shown and described the improved tube construction of our invention in connection with particular system, we recognize that the tube may be used with other systems where a similar inter-ionization effect is desired between two pairs of electrodes. We also realize that the construction may be varied considerably without departing from the invention. It should therefore be clearly understood that the embodiment herein shown and described is to be regarded as one example of the invention only and as not a limitation of the scope of the invention as set forth in the object thereof and the appended claims.

We claim:

1. A gas filled tube comprising a longitudinal metallic chamber containing an ionizing gas, two pairs of parallel, longitudinally disposed electrodes comprising two cold cathodes and two cold anodes, one anode and one cathode being co-operatively adapted to rectify oscillating energy applied thereto, the other anode and cathode providing a spark gap in said chamber, a partition for dividing said rectifying electrodes from said spark gap electrodes, glass beads for sealing the ends of said longitudinal metallic chamber, and a pair of lead wires connected to said electrodes extending through each of said beads.

2. A gas filled tube comprising a longitudinal metallic chamber containing an ionizing gas, two pairs of parallel, longitudinally disposed electrodes comprising two cold cathodes and two cold anodes, one anode and one cathode being co-operatively adapted to rectify oscillating energy applied thereto, the other anode and cathode providing a spark gap in said chamber, and a foraminated partition for dividing said rectifying electrodes from said spark gap electrodes but permitting a limited communication of ions in said gas therethrough.

HENRI G. BUSIGNIES.
LOUIS A. DE ROSA.

REFERENCES CITED

The following references are of record in the file of this patent:

UNITED STATES PATENTS

| Number | Name | Date |
|---|---|---|
| 1,787,689 | Lederer | Jan. 6, 1931 |
| 1,962,062 | Evans | June 5, 1934 |
| 2,009,375 | Ford | July 23, 1935 |
| 2,033,375 | Giard | Mar. 10, 1936 |
| 2,076,286 | Warren | Apr. 6, 1937 |
| 2,080,926 | Penning | May 18, 1937 |
| 2,116,702 | Kern | May 10, 1938 |
| 2,152,992 | Francis | Apr. 4, 1939 |
| 2,265,323 | Spanner | Dec. 9, 1941 |
| 2,273,958 | Holden | Feb. 24, 1942 |
| 2,304,768 | Lederer | Dec. 8, 1942 |
| 2,373,175 | Depp | Apr. 10, 1945 |